Figure 1:
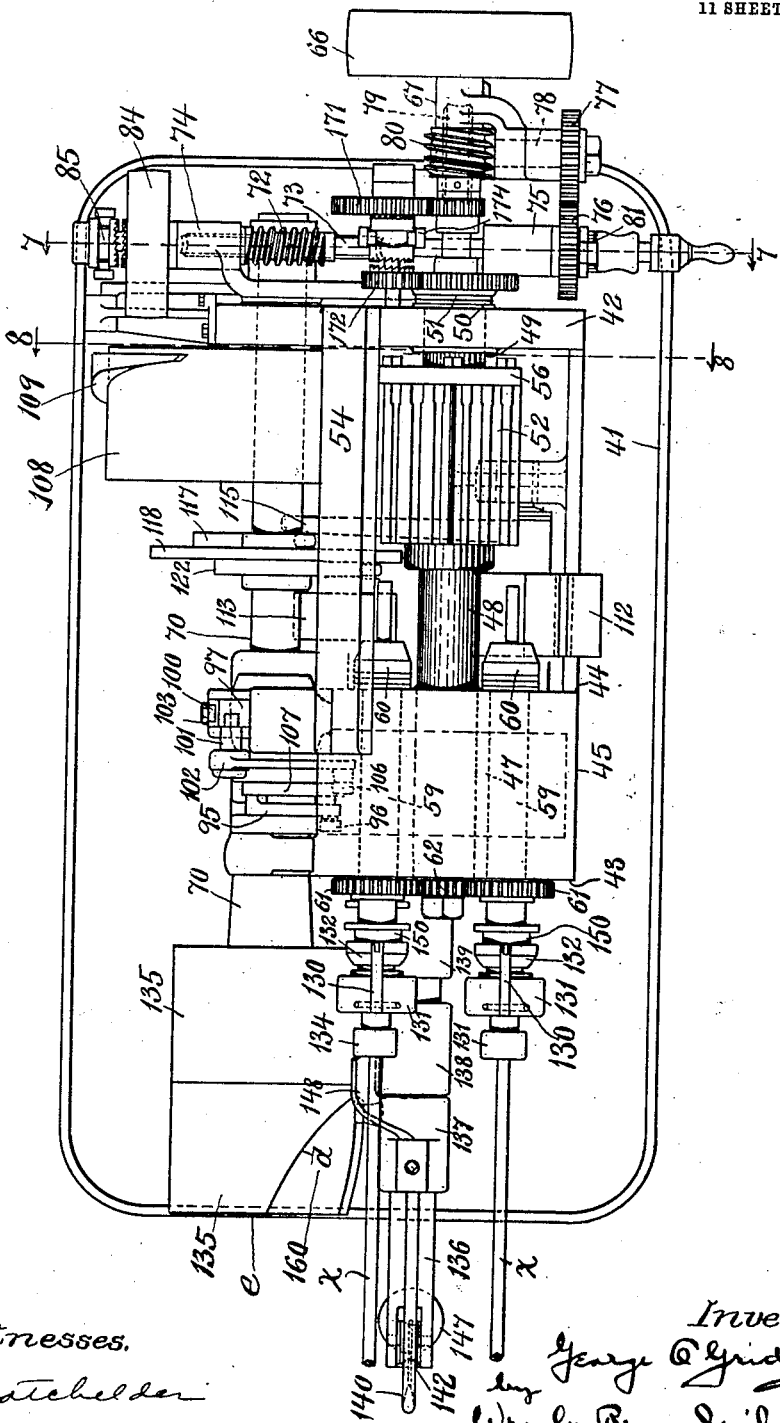

G. O. GRIDLEY.
MULTISPINDLE MACHINE.
APPLICATION FILED JULY 1, 1907.

904,866.

Patented Nov. 24, 1908.
11 SHEETS—SHEET 2.

Witnesses.
E. Batchelder
A. L. Folsom

Inventor.
George O. Gridley
by Wright Brown Quimby & May
Atty

G. O. GRIDLEY.
MULTISPINDLE MACHINE.
APPLICATION FILED JULY 1, 1907.

904,866.

Patented Nov. 24, 1908.
11 SHEETS—SHEET 5.

Witnesses.
E. Batchelder
A. L. Folsom

Inventor.
George O. Gridley

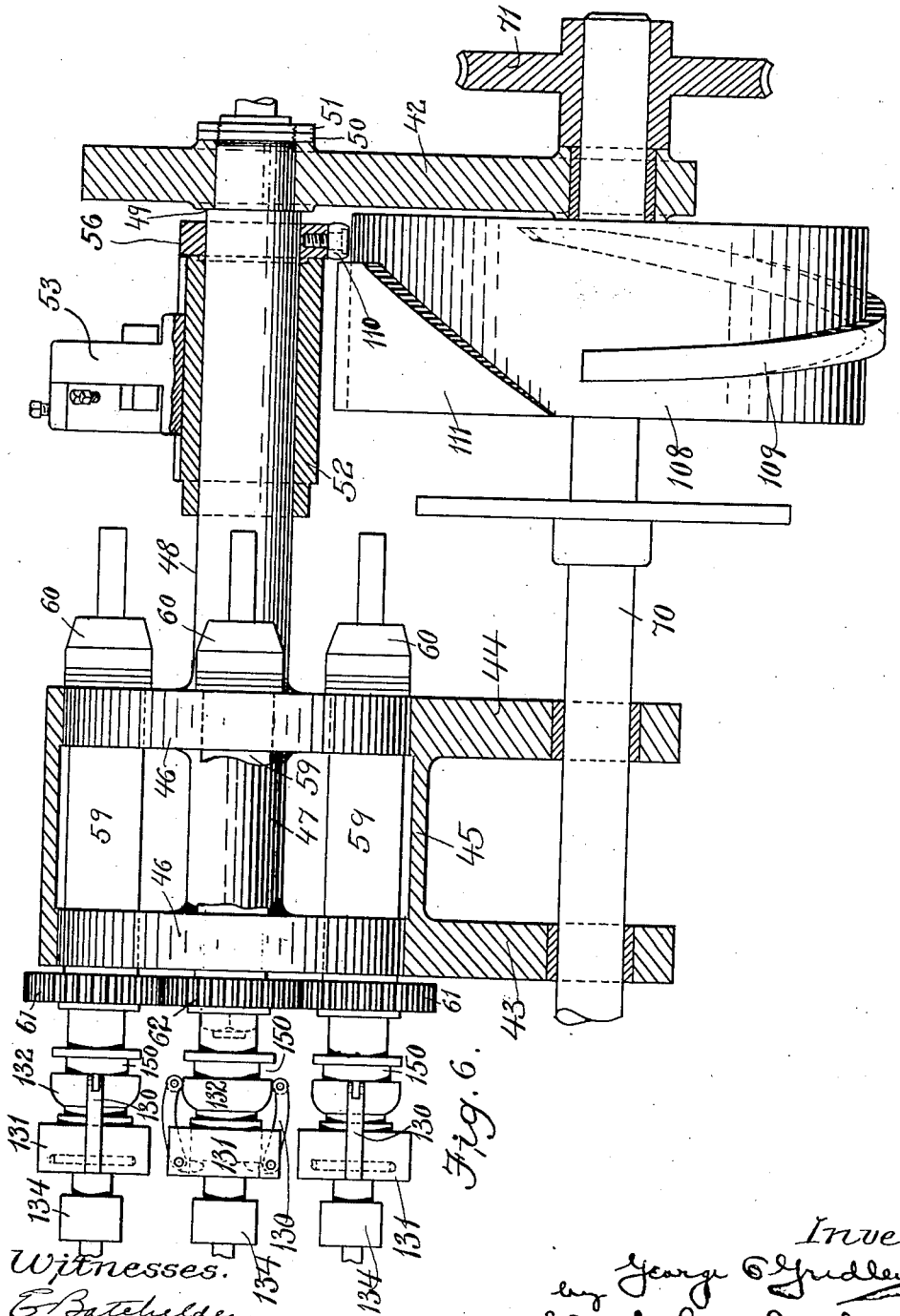

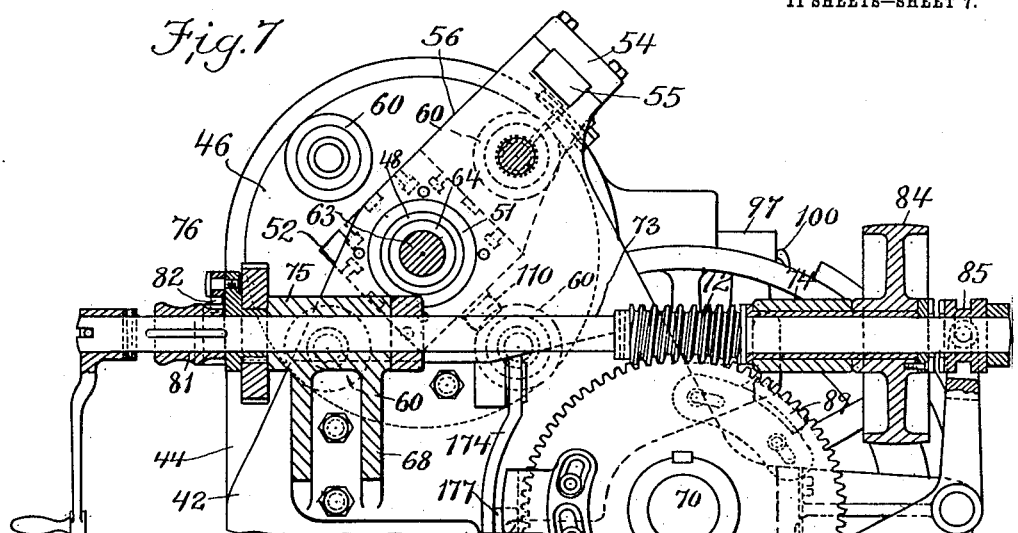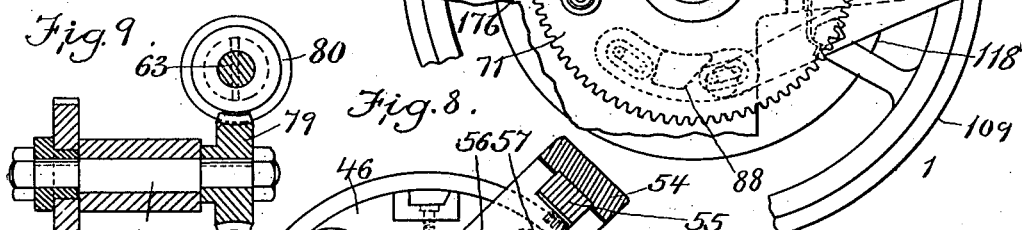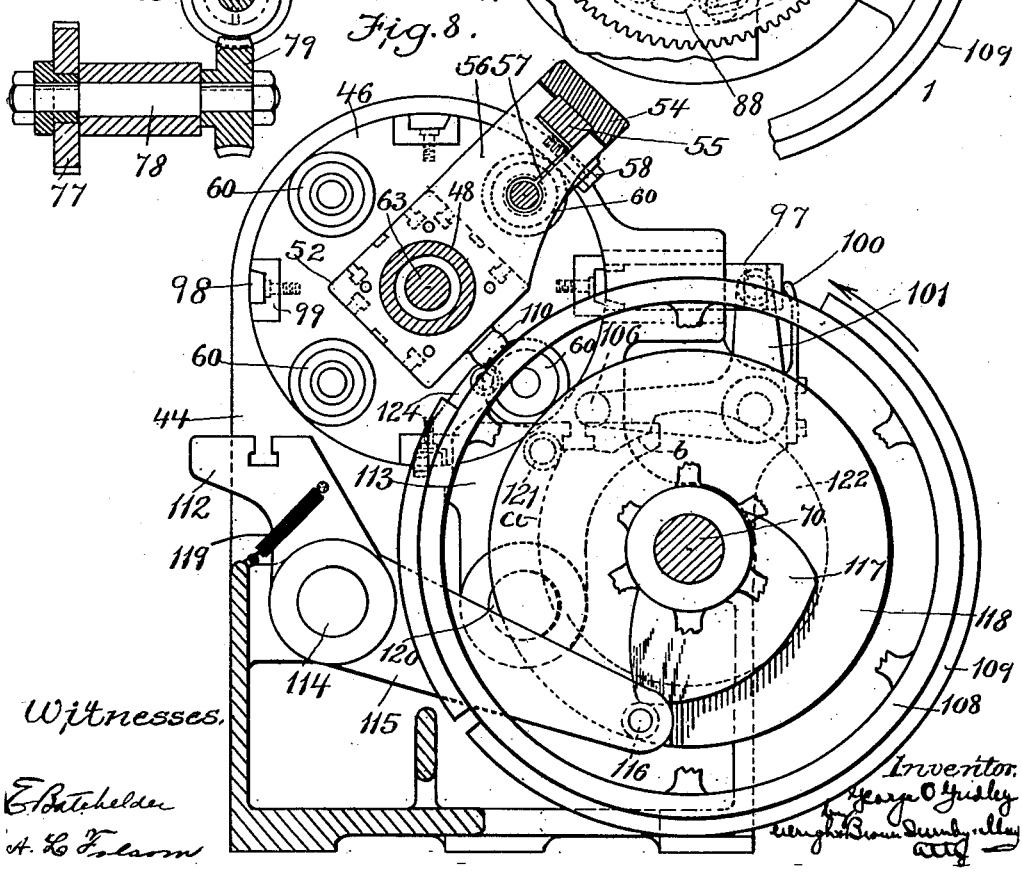

G. O. GRIDLEY.
MULTISPINDLE MACHINE.
APPLICATION FILED JULY 1, 1907.

904,866.

Patented Nov. 24, 1908.
11 SHEETS—SHEET 8.

Witnesses
E. Batchelder
A. L. Folsom

Inventor.
George O. Gridley
by Wright, Brown, Quinby & May
attys

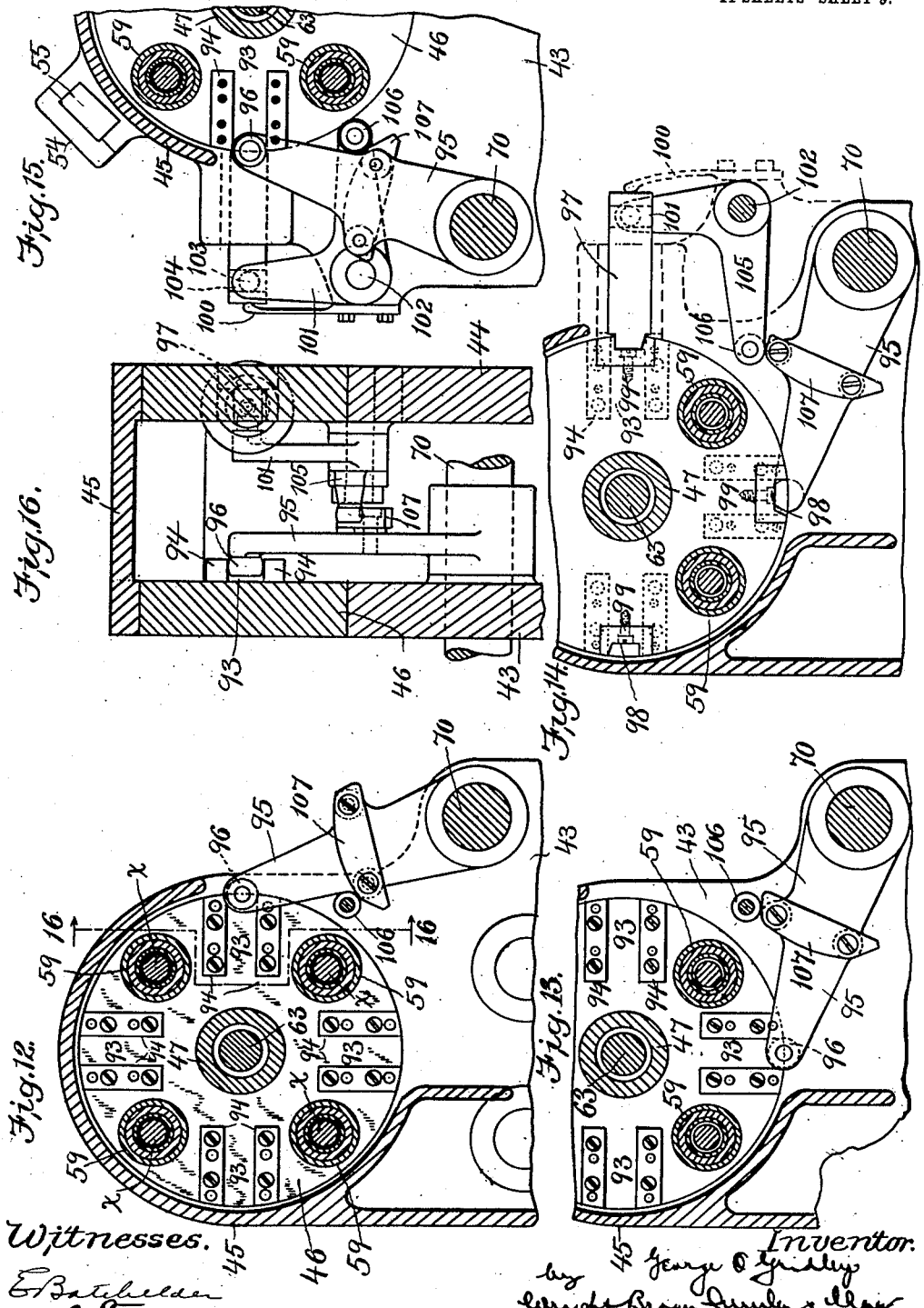

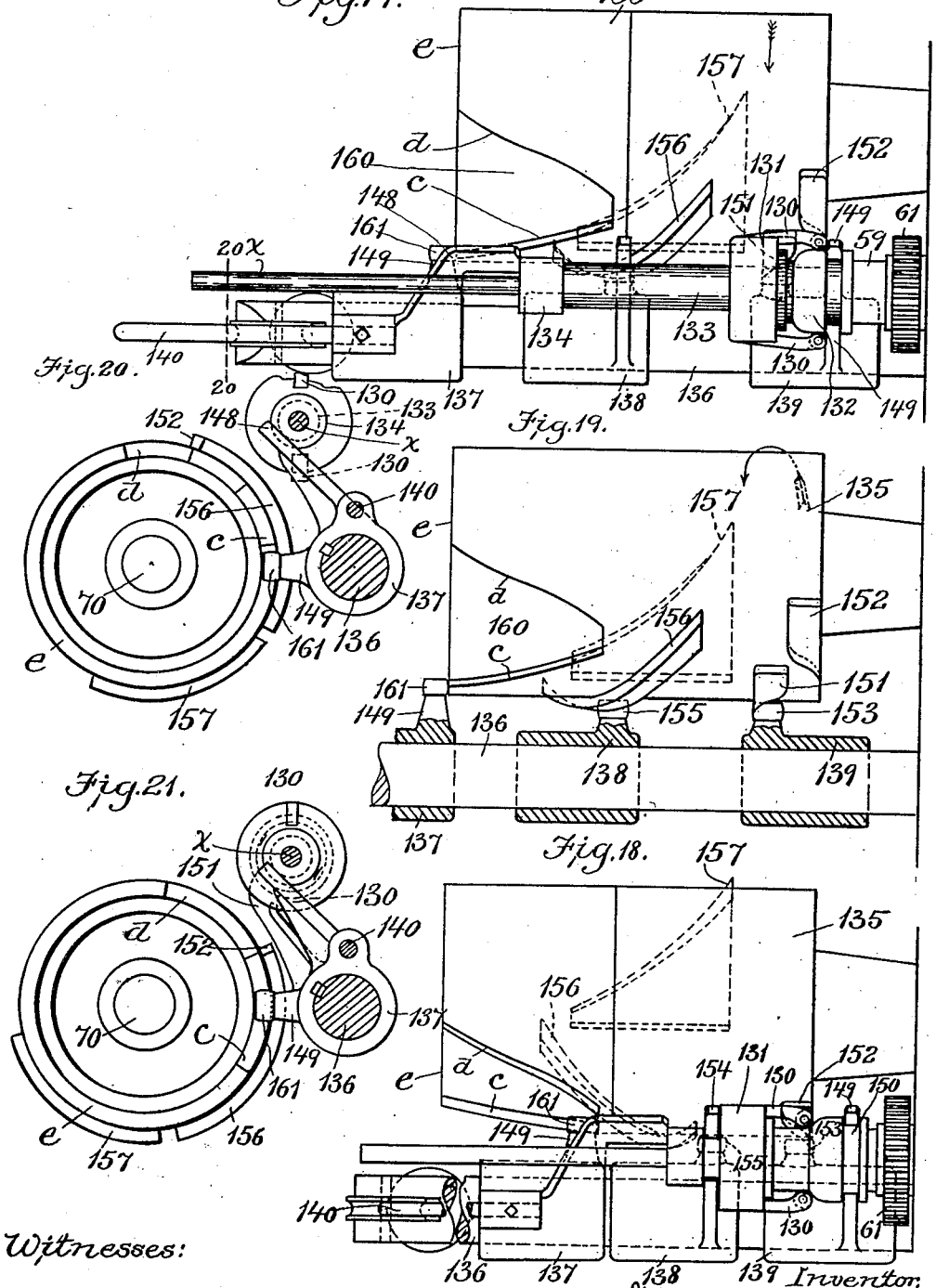

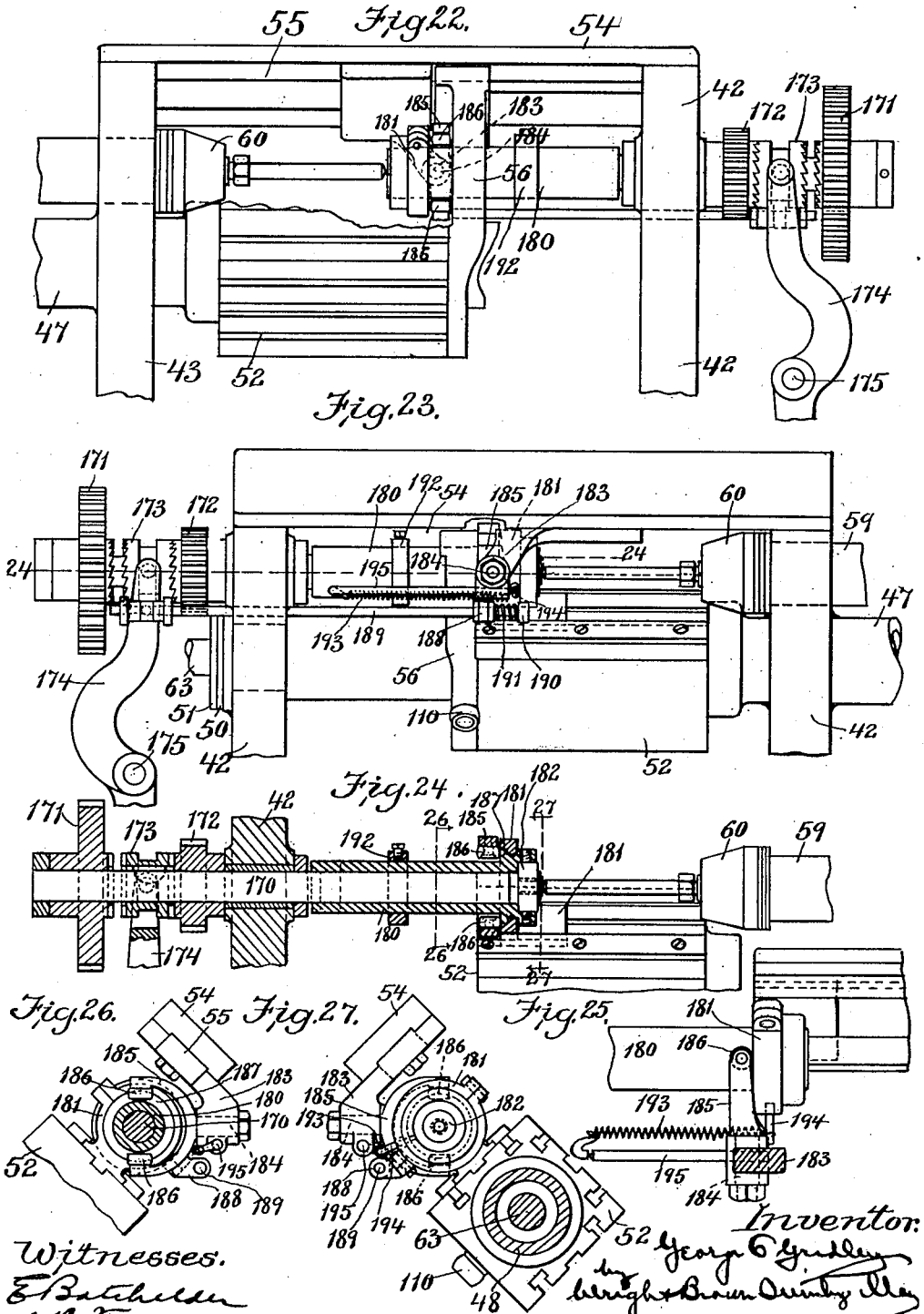

UNITED STATES PATENT OFFICE.

GEORGE OTIS GRIDLEY, OF WINDSOR, VERMONT.

MULTISPINDLE-MACHINE.

No. 904,866.  Specification of Letters Patent.  Patented Nov. 24, 1908.

Application filed July 1, 1907. Serial No. 381,599.

*To all whom it may concern:*

Be it known that I, GEORGE OTIS GRIDLEY, of Windsor, in the county of Windsor and State of Vermont, have invented certain new and useful Improvements in Multispindle-Machines, of which the following is a specification.

This invention has relation to metal-working machines and more particularly to those machines known as multi-spindle screw machines, in which there are provided a plurality of rotary work-carrying spindles arranged about a common axis, and a plurality of tools likewise supported about a common axis with provisions for rotating the tools or the work, step-by-step, one with relation to the other, so that all of the pieces of work are operated upon simultaneously and successively by the various tools. It has heretofore been customary in the construction of commercial machines of this type, to provide two supports, one for the tool-carrier and one for the work-carrier, and to place these supports independently of each other upon the bed of the machine, and to employ mechanism for sliding one of the supports towards and from the other to secure the necessary feed. This construction has inherent to it several serious faults which have prevented the production of accurate finished work. Since the work-carrying spindles must be arranged equidistant from each other and equidistant from the common axis, the tools must all be arranged so that each will accurately register with each piece of work as it is presented thereto. Where the tools and the work spindles are mounted upon separate supports which are placed independently of each other upon a common bed, it is very difficult and almost impossible to secure the nice and accurate registration of the tools with the work, and to obtain the production of pieces of work which are exactly the same. Another fault which may be found in machines of the character referred to is that they necessarily employ special tools or cutters for operating upon the work, which tools or cutters have a long overhang and are liable to bend or give in the cutting strains which are experienced in operation. The provision of such extra tools is an added expense, as many of them have to be formed to operate in a manner reverse from that in which the ordinary tool operates in a turret lathe or other analogous machine. Again, in such machines, provision must be made, where the machine is employed for making bolts or screws, for stopping the rotation of the spindle carrying the work which is undergoing the threading or tapping operation, and means for rotating the threading die or tap must be provided. This necessarily entails considerable automatic mechanism which is liable to get out of order and which adds to the cost of the machine.

The object of the present invention is to obviate the disadvantages and correct the faults which I have thus referred to. This is accomplished in the machine which I have shown upon the drawings as illustrating one embodiment of the invention, by forming or providing the spindle-carrying turret with an elongated central shaft or bearing upon which the tool-carrier is journaled. The turret is supported or mounted in an encircling bearing which is rigidly secured to the bed, and its projecting bearing, or shaft, is at its end mounted in another bearing which is rigidly secured in the bed. This provides against any lateral play of the turret since it is journaled or mounted in two relatively remote bearings. The tool-carrier is, as stated, supported upon the turret shaft, and means are provided for causing the tool-carrier to slide back and forth upon said shaft. Since the tool-carrier may be made to fit accurately upon its central bearing, which forms a part of the turret itself, there is practically no liability of the work-carrier springing relatively to the turret or spindle-carrier, and hence the tools may be caused to register accurately with the work. It is possible with this construction to rotate either the work-carrier or the tool-carrier, but for convenience of construction and for accommodating other features of the machine, I prefer to rotate the work-carrying turret, and to hold the tool-carrier against rotation, this being accomplished in the present case by a Geneva stop mechanism which I utilize to rotate the turret with a step-by-step movement, and by employing a guide rigidly secured to the bed with which the tool-carrier registers to prevent its rotation and to guide it in its movement toward and from the work.

By mounting the tool-carrier upon a central support, as described, I am able to so restrict its diameter that it may be moved within the circle defined by the centers of the work, and thus to employ box tools and other forms of tool in which there is no overhang, and consequently no liability for the springing of the parts. This is a decidedly advantageous feature of my invention as it enables me to utilize the best form of tools now known to manufacturers of metal-working machinery.

In the illustrated embodiment of the invention, I provide a simple form of gearing for effecting the rotation of the work-carrying spindles. While it may be unnecessary so far as the other features of the invention are concerned, yet I preferably employ a single intermeshing train of gearing by which the work is continuously rotated, and with this construction I provide for threading or tapping the work by rotating the tap or die in the same direction as the work rotates, but at two different speeds, to wit,—first, at a slow speed to advance the tap or die along the work, and then with a higher speed to withdraw the same. This, of course, is for the production of right hand threads only, assuming that the work is being rotated in the usual direction in which it is rotated in turret machines employing a single work-spindle.

In addition to the features pointed out, the invention has further for its object to provide an improved mechanism for feeding the stock automatically, the same including a weight-actuated stock feeder and mechanism for controlling the operation thereof.

Figure 2:
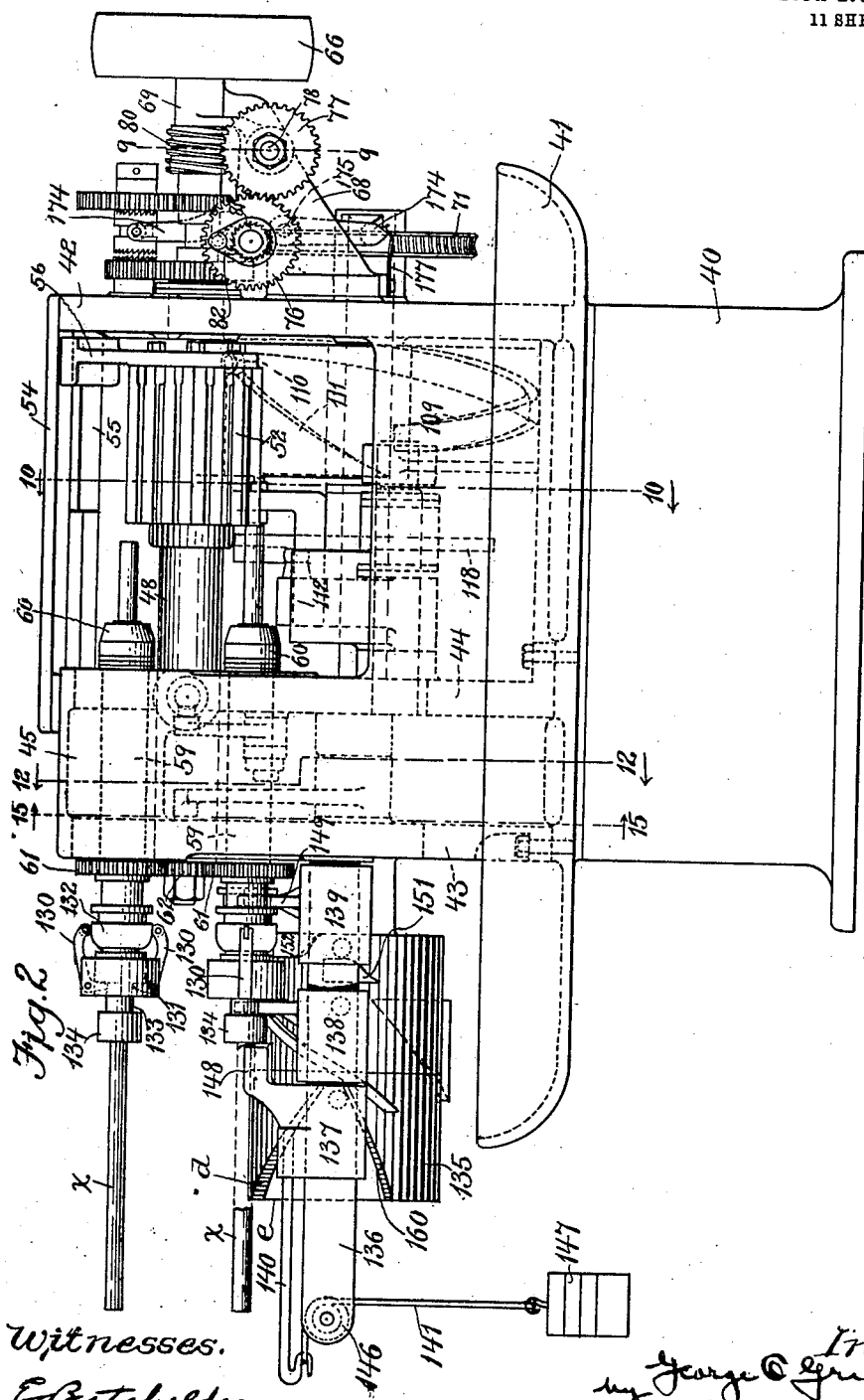
Figure 3:
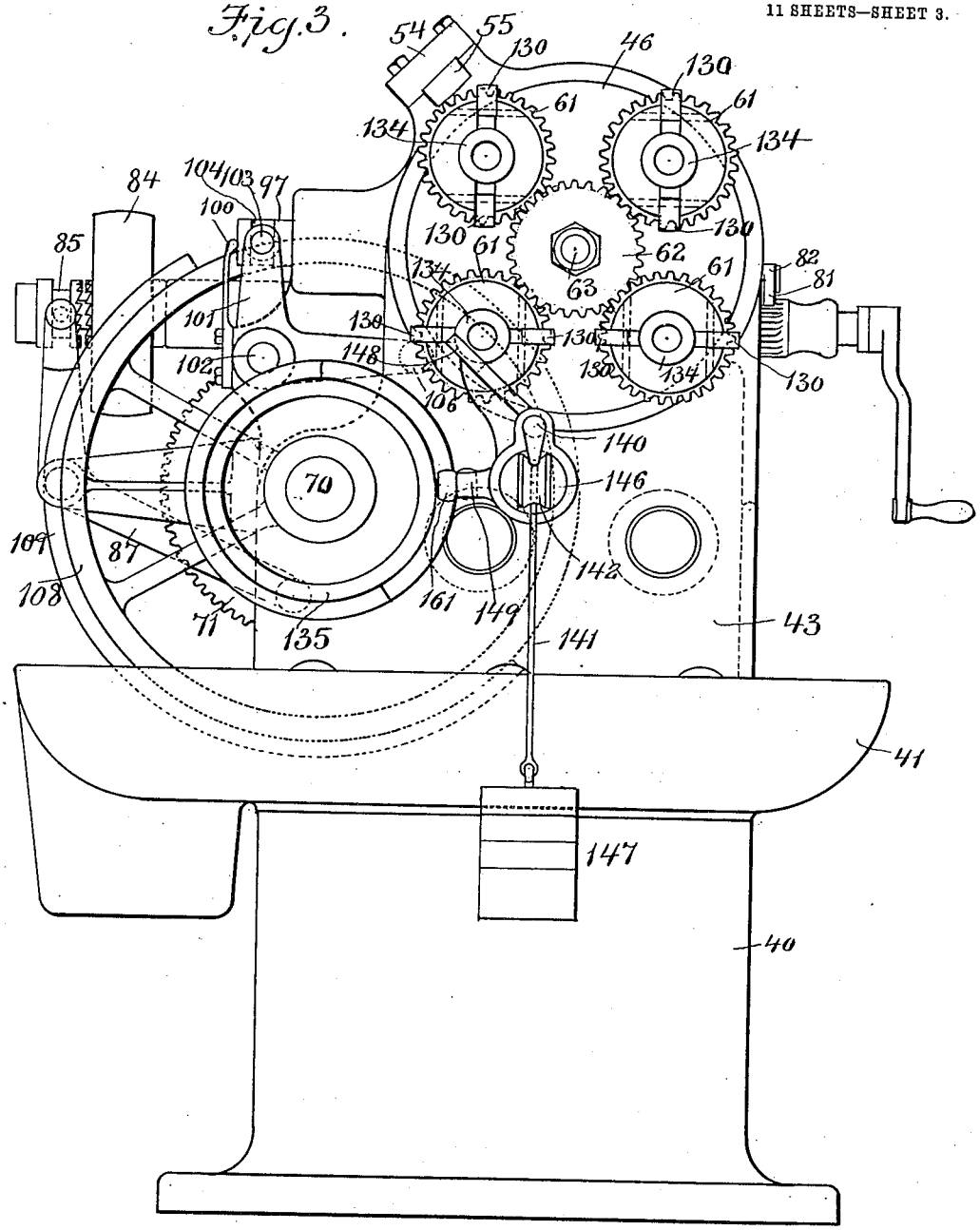
Figure 4:
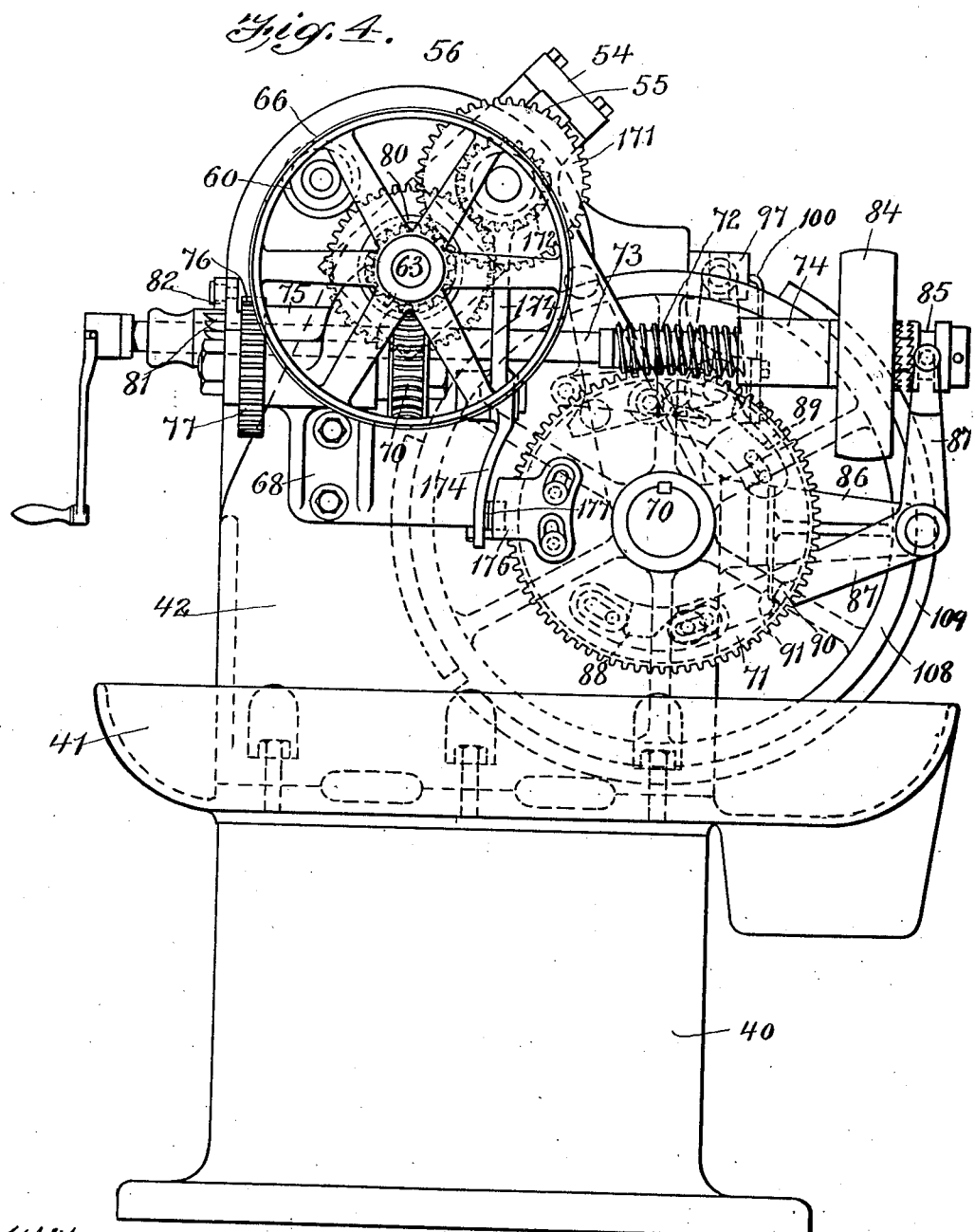
Figure 5:
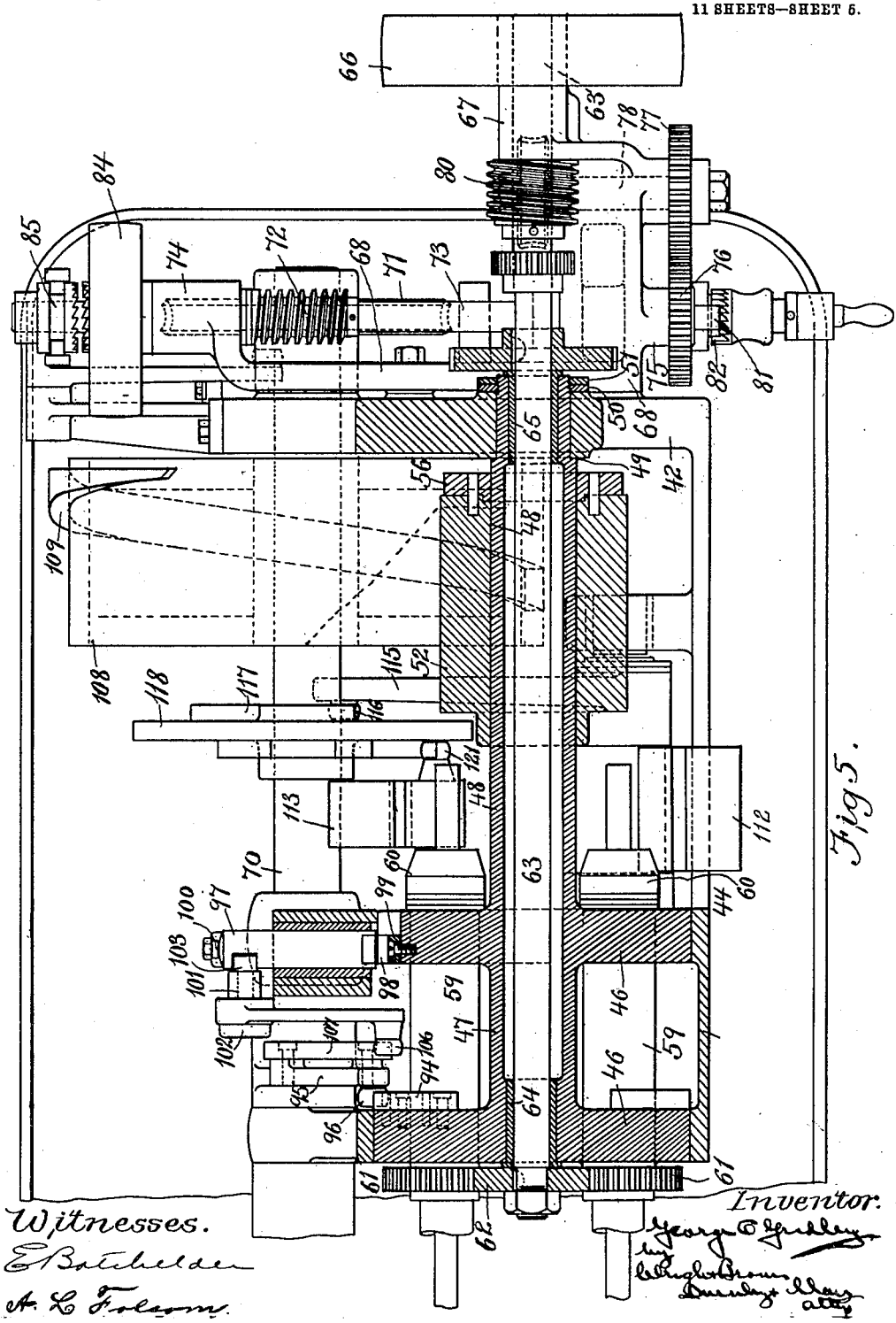
Figure 10:
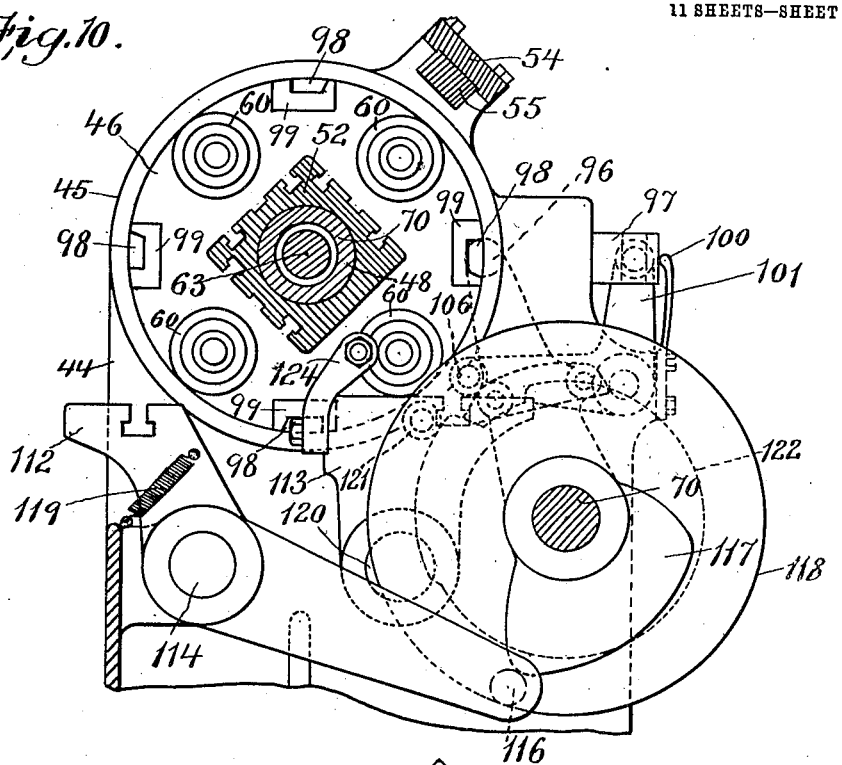
Figure 11:
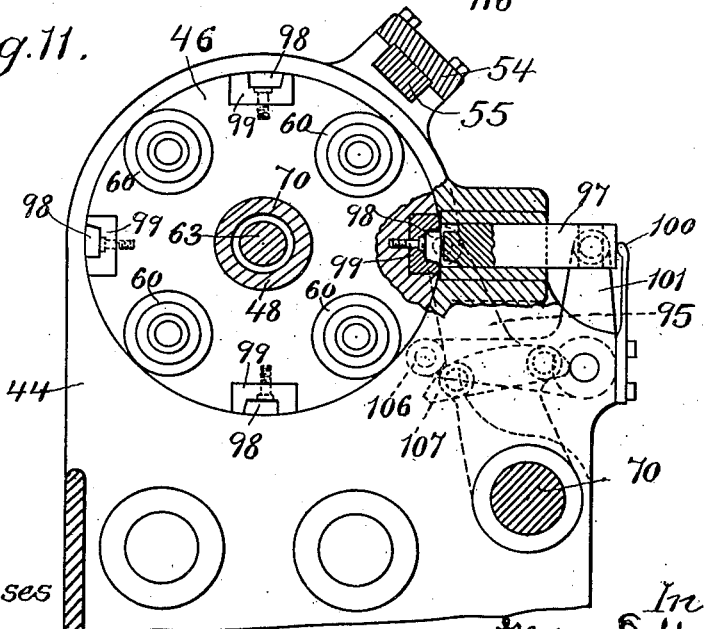

Referring to the drawings,—Figure 1 represents in plan view a machine embodying the invention. Fig. 2 represents a front elevation of the same. Fig. 3 represents an elevation of one end, and Fig. 4 represents an elevation of the other end of the machine. Fig. 5 represents a horizontal section taken through the axis of the turret. Fig. 6 represents the turret, the tool-holder, and the cam drum which effects the reciprocation of the tool-carrier, some of the parts being shown in section. Fig. 7 represents a section on the line 7—7 of Fig. 1, gearing for operating the tap or die being omitted. Fig. 8 represents a section on the line 8—8 of Fig. 1. Fig. 9 represents a section through the line 9—9 of Fig. 2. Fig. 10 represents a section on the line 10—10 of Fig. 2. Fig. 11 represents a vertical section through the machine looking at the ends of the work, and shows the parts broken away for the purpose of illustrating the index pin. Figs. 12 and 13 represent sections on the line 12—12 of Fig. 2, and illustrate the operation of the Geneva stop mechanism. Fig. 14 represents a section through the machine to illustrate the construction of the index pin and the member which operates it. Fig. 15 represents a section on the line 15—15 of Fig. 2, looking in the direction of the arrow. Fig. 16 represents a section on the line 16—16 of Fig. 12. Fig. 17 represents in plan view, the stock-feeding mechanism. Fig. 18 represents a similar view with the parts in a different position. Fig. 19 represents a partial horizontal section through the same mechanism and shows the slides in the position in which they are when ready to open the chuck. Fig. 20 represents a section on the line 20—20 of Fig. 17. Fig. 21 represents a section on the line 21—21 of Fig. 18, though the drum has been advanced a partial revolution from the position shown in Fig. 18. Fig. 22 is a fragmentary view of the machine and shows the threading die. Fig. 23 is a similar view looking from the other side. Fig. 24 represents a section on the line 24—24 of Fig. 23. Fig. 25 is a fragmentary view of the threading mechanism. Fig. 26 represents a section on the line 26—26 of Fig. 24. Fig. 27 represents an end elevation, being substantially a section on the line 27—27 of Fig. 24.

Before explaining in detail the construction and mode of operation of the machine, I desire to have it understood that the invention is not limited to the details of construction and arrangement of parts which are illustrated upon the accompanying drawings, that the invention is capable of other embodiments, and that the phraseology which I employ is for the purpose of description and not of limitation.

Referring to the drawings,—40 indicates the bed of the machine which has upright front, rear and end walls. It is formed with a laterally and upwardly projecting flange 41 which forms a pan for the reception of chips and oil. Bolted to the lower section of the bed is the upper section or frame comprising the wall 42 at one end, and the walls 43 44 at the other end. These walls extend from front to rear of the machine and are connected by the front wall of the upper section. The walls 43 44, as shown in Fig. 6, are connected by a web 45 to tie them together. Journaled in bearings formed in the walls 43 44, is the turret which carries the work-spindles. The said turret is formed with the disk-like ends 46 46 connected by a tubular middle portion 47. The turret is formed or provided with a projecting extension or hollow shaft 48, the end of which is journaled in the end wall 42. The said shaft 48 is formed with a shoulder 49 to engage the inner face of the wall 42, and its extremity is threaded to receive the locking nuts 50 51 which are placed exterior to the wall 42 to prevent the turret from axial movement. From this description; it will be observed that the turret has not only a peripheral bearing but substantially a central bearing, so that it is incapable of any loose play. Mounted to slide upon the projecting extension 48 or shaft of the turret, is the tool-slide or carrier 52. This slide is preferably provided with flat faces for the reception of tools, being illustrated as having four flat faces which are longitudinally grooved to receive the bases of tools which may be adjusted longitudinally thereon. One of these tools is illustrated at 53 in Fig. 6. By mechanism which will subsequently be explained, the turret is rotated with a step-by-step movement, being locked after each step by an indexing pin, and the tool-slide is moved toward and from the turret. Inasmuch as the turret extension is cylindrical and rotates with the turret, it is necessary to provide an exterior guide for the tool-slide. Hence, there is attached to the end walls of the frame, a bar 54, (see Figs. 1, 2 and 10). This bar extends in parallelism with the axis of the turret and is provided with a guide 55 extending longitudinally thereof. The guide 55 and its supporting bar 54 might be formed in one piece, but as shown, they are formed separately as it is desirable to make the guide of steel that will withstand wear. Bolted or otherwise secured to the outer end of the tool-carrier, there is an arm 56, (see Fig. 8) which is bifurcated at its end so as to straddle the guide. To compensate for wear, this arm is slit as indicated at 57, and a screw 58 is passed through the two members thus formed so that they may be drawn closer together whenever necessary. In the end disks of the walls 46 46 of the turret, are journaled the work-spindles 59. The bearings for the spindles are separated from each other, being located at substantially the ends of the spindles, so that the spindles are held against loose movement. The inner end of each spindle is provided with a chuck 60 which may be constructed in the ordinary manner. On their outer ends the spindles are provided with gears 61 intermeshing with a gear 62, which is rigidly secured to a shaft 63, (see Fig. 5) which is journaled in bushings 64 65 in the turret, and its extension or shaft 48. This shaft is provided on its end with a pulley 66, by which it may be rotated from a convenient source of power. The extremity of the shaft is journaled in a bearing 67 afforded by a bracket 68 attached to the right hand end of the machine. This shaft 63 is the main power shaft of the machine and from it power is transmitted to the various operating parts of the machine with one exception as will be subsequently explained.

The mechanism for rotating the turret with a step-by-step movement will now be explained. Journaled in the end walls of the machine in the horizontal plane below the plane of the axis of the turret, there is a cam or feed shaft 70, which shaft carries not only the mechanism for effecting the step-by-step movement of the turret, but it also carries the cam which effects the feed of the tool-slide. This cam shaft may be driven either from the main power shaft of the machine, as when the work-spindles are being rotated and the work-slide is advancing, or else from a separate source of power to rapidly rotate and index the turret and retract the tool-slide. On its end it is provided with a worm wheel 71 which intermeshes with and is driven by a worm 72 on a shaft 73, extending from front to rear of the machine, as shown in Figs. 1, 2 and 5. The shaft 73 is journaled in suitable bearings 74 75 formed on the bracket 68, hereinbefore referred to. At its front end it has loosely placed upon it, a gear 76 which intermeshes with and is driven by a gear 77 on the shaft 78 (see Figs. 5 and 9), said shaft 78 being parallel to the shaft 73. Said shaft 78 has rigidly secured to it, a worm wheel 79 which intermeshes with and is driven by a worm 80 on the main power shaft 63. I have stated that the gear 76 is loose upon the shaft 73 and hence, in order that power may be transmitted to the shaft from the gear, I spline upon said shaft a ratchet 81, and provide the gear 76 with the pawl 82, as shown in Figs. 2 and 5, so that when said gear wheel 76 is rotated, it will effect the rotation of the ratchet 81 and hence of the shaft 73. The operator may move the ratchet to an inoperative position with respect to the pawl and thus stop the shaft 70 without stopping the work-spindles. The provision of the pawl and ratchet enables the shaft 73 to be rotated at a higher speed than that at which the gear 76 is rotated. By the power transmitting mechanism thus explained, the shaft 70 will be rotated from the main power shaft of the machine at a speed proportionate to the speed of said prime power shaft. I provide, however, mechanism for rotating the shaft 70 at a greater speed for the purpose of effecting a rapid recession of the tool-slide and for other purposes. This is accomplished by mounting loosely upon the shaft 73, a belt pulley 84 which may be driven from a countershaft or motor. A clutch 85 which is keyed to slide upon the shaft 73 is associated with the pulley for the purpose of clutching or unclutching the pulley to or from the shaft. When the pulley is clutched to the shaft, it will be driven at a greater rate of speed, and consequently, the speed of the shaft 70 will correspondingly be increased. The clutch 85 is automatically thrown into and out of operation. To this end there is fulcrumed on the bracket 86, a two-armed lever 87, one arm of which engages the clutch 85, and the other arm of which extends into proximity to the worm wheel 71. Said worm wheel is provided with cams 88 89 for swinging the lever in one direction or the other. To hold said lever in either of the positions to which it may be moved, it is formed with a lug 90 with which is engaged the bent end of the spring 91 attached to the bracket 87.

Having thus explained how the shaft 70 is operated, I will now explain the mechanism which is operated thereby to effect the step-by-step rotation of the turret, reference being had to Figs. 10 and 15. On the inner face of the end wall or disk 46 of the turret, are grooves or guideways 93 93. These are formed by securing in said face, parallel guides or guide-bars 94. To the shaft 70 is secured an arm 95 which rotates therewith, said arm being provided with a roller 96 which is adapted to enter the grooves 93 successively. As shown in Fig. 12, the roller 96 is just entering one groove, and in Fig. 13, it is shown as emerging from said groove, after having rotated the turret through an arc of 90°. The turret is advanced one step by one complete rotation of the shaft 70.

In Fig. 14 is shown the indexing pin 97, by which the turret is normally held against rotative movement. This pin is adapted to slide in a guideway formed in the rear wall of the upper portion of the bed, and its end is formed to enter notches or recesses 98 formed in the hardened steel blocks 99 set in sockets in the inner end wall 46 of the turret, as best shown in Fig. 5. The indexing pin is normally pressed inwardly by a spring 100 which bears against the end thereof. The pin must be withdrawn before the turret can be rotated, and this is accomplished by mechanism comprising a bell crank lever 101, fulcrumed at 102, (see Fig. 5). One arm of the bell crank is provided with a pin 103 which enters a transverse groove 104 in the end of the indexing pin 97. The other arm 105 is provided with a roller 106 which is adapted to be engaged by cam 107 formed on or secured to the arm 95. This cam is of such length and shape that immediately before the roller 96 on the end of the arm 95 enters one of the grooves 93, said cam engages the roller 106 and rocks the bell crank to withdraw the locking or indexing pin, so that as said arm continues its movement, it may advance the turret one step. The cam, however, releases the indexing pin in time to have it enter the next notch in the turret when the turret has advanced through an arc of 90°.

The mechanism for advancing and withdrawing the tool slide 52 consists of a drum 108 having a long spiral cam 109 for engagement with a roll 110 attached to the arm 56 as shown in Figs. 6 and 8. This cam advances the tool-slide slowly towards the work. On the drum 109 is another cam 111 having a sharp pitch for withdrawing the tool-slide. The shaft 70, on which the drum 108 is mounted, is rotated slowly from the main power-shaft 63 when the tool-slide is being fed towards the work. After the tools have completed their operations on the pieces of work, the clutch 85 is automatically thrown into engagement with the pulley 84 by a cam 88 on the gear 71 acting on the lever 87. The shaft 70 is then driven at high speed to effect the rapid withdrawal of the tools from the work, the rapid actuation of the forming and cutting-off tools to be described, and the partial rotation of the turret, all in the order named. In addition to the tools which are mounted upon the tool-carrier or slide, I make provision for two extra tool-carriers, one for carrying a forming tool and the other for carrying a cutting-off tool.

Referring to Figs. 1, 5, and 8, these two tool-carriers are indicated at 112 and 113; that at 112 being for the reception of the forming tool and that at 113 for the cutting-off tool.

As shown in Fig. 8, the forming tool-carrier consists of an arm which is fulcrumed upon the stud-shaft 114 mounted in the bed, said arm having a flat upper surface which is grooved longitudinally of the machine to receive the tool. To the arm 112 is attached a lever 115, having a pin or roll 116 which is engaged by the periphery of a cam 117. This cam is formed on or secured to the face of a disk 118, which is rigidly mounted upon the shaft 70. This cam 117 moves the tool-carrier 112 towards the work. Any convenient means may be utilized to return the carrier to its initial position, either by another cam on the face of the disk 118 or else by a spring as shown at 119. The carrier 113 for the cutting-off tool likewise consists of an arm which is fulcrumed upon a shaft 120 made in the bed in parallelism with that at 114. Said arm has a flat upper face which is longitudinally grooved to receive the base or shank of the cutting-off tool. On one side of the carrier 113 is a roller 121 which by reason of a spring not shown engages a cam 122 formed or secured on the face of the disk 118 opposite the face on which the cam 117 is formed or secured. The carrier for the cutting-off tool also serves to receive and support the stop for the stock or work to limit the feed thereof. This stock stop, as it is termed, is shown at 124 in Fig. 8 and is secured to the front face or edge of the carrier 113. The cam 122 is formed with a rise $a$ and with a depression $b$. The rise $a$ forces the carrier 113 forward to cause the cutting-off tool to sever the stock and then, as the roll 121 moves into the depression $b$, the carrier 113 moves the stock stop into alinement with the axis of the spindle through which the stock is about to be fed.

Referring to Figs. 1, 2, 3, and 17 to 21, I will explain the means by which the stock is fed automatically. I have not described in detail the construction of the work-carrying spindles as it is well known to those skilled in the art. Each possesses a chuck, the jaws of which open by spring-pressure when the fingers 130, 130, which are pivoted to a collar 131 attached to the rear end of the spindle, are opened by the axial movement of the cone 132. Within the spindle there is a sleeve or tube 133 which projects outward through the rear end thereof and is formed with a collar 134. This sleeve or tube carries the usual spring-pressed fingers (not shown) which engage the stock and feed it forward when the tube is advanced within the spindle. Thus each spindle is provided with the longitudinally movable stock-feeding sleeve 133 and with the collar 134, and with the axially movable cone 132 which moves the fingers 130 for the purpose of opening the chuck. The stock, which consists of bars of any desired length, is indicated at $x$, each bar passing through one of the spindles in the usual way as shown. I provide a cam drum 135 which is secured upon the shaft 70 and which is provided with cams for accomplishing the purposes to be stated. Secured to the left-hand end of the bed and projecting therefrom longitudinally of the machine is a guide-bar 136. Upon this bar are mounted three slides 137, 138, and 139, these slides being controlled by cams on the drum. The slide 137 is provided with a projecting hooked pin 140, to which is attached one end of a flexible connection 141. This connection may consist of a rope which is passed around the pulley 142 in the end of the guide 136, and it supports a weight 147, which, by the action of gravity, causes the slide 137 to be moved along the guide 136 towards the machine to feed the stock. The said slide 137 has an arm 148, with the end of which the collar 134 on each spindle may register, as said spindle reaches a position in which the stock carried thereby may be cut off by the cutting-off tool and the stock may be fed to present a new piece of work to the tools. The slide 139 is provided with an arm or finger 149 which enters the peripheral groove 150 in the cone 132 as shown in Figs. 17 and 18. The slide 139 is moved first in one direction to open the chuck and then in the opposite direction to close it by cams 151 and 152 which are secured upon the drum 135, said slide being provided with a roller 153 with which said cams may engage. The intermediate slide 138 is substantially like that at 139 being provided with an arm 154 which may engage the shoulder on the collar 134. This slide has a roller 155 which is engaged by cams 156, 157. The cam 157 moves the slide 138 to the left so as to draw out the stock-feeding tube 133. This slide is returned to its initial position by the movement of the slide 137 acting under the influence of the weight 147, but, in case the weight should not move the slide 138 to its maximum limit of inward movement, the cam 156 is provided so that it will engage the slide 138 and move it to its proper predetermined position in order that its arm or finger may enter between the collar 134 and the collar 131 when the next spindle comes into stock-feeding position. The cam 156 will also act in the same way when the stock stop is set to prevent the stock from being fed its maximum length of feed. The weight 147 moves the slide 137, as stated, but the movement of this slide is controlled by the drum 135 which is provided at its left-hand end with a V-shaped notch 160, the edges of which form cam surfaces for engaging a roller 161 on the slide 137. The cam surface $c$ controls the inward movement of the slide 137, whereas the cam surface $d$ moves the slide 137 outward, the surface $e$ at the end of the drum holding said slide at its outward extremity of movement at all other times.

The operation of this portion of the mechanism is as follows: Assuming that the cutting-off tool is severing the projecting end of the stock which is carried by the spindle now in proximity to the cam drum, the cam 157 moves or is now moving the slide 138 outward or to the left so as to draw outward the stock-feeding tube, and then the cam 151 moves the slide 139 to the right to open the chuck. Immediately the cam surface $c$ permits the weight 147 to move the slide 137 along the guide 136 and the arm or finger 148, engaging the collar 134, pushes the stock-feeding tube through the spindle until the stock engages the stock stop which is now in proper relation to the spindle. As the drum continues to rotate, the cam 152 moves the slide 139 outward to cause the jaws of the chuck to close, and the cam 156 moves the slide 138 to its initial position so that the arm or finger carried thereby may be in position to operate upon the collar of the stock-feeding tube of the next spindle as it comes into position.

There now remains to be described the threading mechanism by which the work in each spindle may be threaded, either externally or internally, when the spindle carrying it has reached its proper position. I have illustrated external threading means which necessarily includes a die, but in lieu of the die, a tap may be substituted without other change of parts. This mechanism is best shown in Figs. 22 to 27 inclusive, taken in connection with Figs. 1 and 2. Journaled in the end wall 42 of the frame, there is a shaft 170 which is arranged longitudinally of the machine and which is provided upon its outwardly projecting end with two loose gears 171 and 172 of different diameters. Between them there is splined on the shaft a clutch 173 having teeth adapted to engage complemental teeth on the said gears. This clutch is adapted to be moved in one direction or the other by an arm 174 fulcrumed at 175. This arm is swung in one direction to clutch the low-speed gear 171 to the shaft 170 by a cam 176 attached to the outer face of the worm-gear 71 as shown in Fig. 4. The arm is adapted to be held yieldingly at either extreme of its movement by a spring 177 (see Fig. 2). The arm is moved in the opposite direction to cause the clutching of the high-speed gear or driver 172 by mechanism which will be explained. Splined on the shaft 170 is an elongated sleeve or tool-carrier for the thread-cutting member 180, which is journaled in a bearing 181, the base of which is mounted to slide longitudinally in guides attached on one face of the tool-slide. In the end of this sleeve 180 is secured the threading die 182, (or a tap not shown).

In Fig. 24 the die is shown in position where it may be advanced to engage the work. This advance movement of the die is accomplished by the following mechanism: Secured to the bar 54 is a bracket 183 in which is journaled the shank 184 of a yoke 185. In the ends of the arms of the yoke are rolls 186. These rolls are adapted to engage a shoulder 187 on the inner end of the sleeve 180. One of the arms of the yoke has a projection 188 through which extends a rod 189 having a forked connection with the lever 174 as shown in Fig. 23. On the inner end of said rod is a head 190 between which and the bracket 188 is a spring 191. Now when the lever 174 is swung to the left in Fig. 23, to clutch the low-speed driver to the shaft 170, the rod 189 is drawn to the left and, through the spring, rocks the yoke about the axis of its shank, so that one of the rollers 186, engaging the shoulder 187, moves the sleeve 180 and the die 182 forward so that the cutting edges of the die may engage the work and begin to thread it. Thereafter, the die is moved along by reason of its engagement with the work as the shaft 170 rotates. To effect the reverse movement of the die, there is placed adjustably upon the sleeve 180 a collar 192 so that, when the sleeve and die are moved forward the proper distance, the collar will engage the yoke and rock it back to the position shown in Fig. 24 (from which it was previously rocked when the low-speed driver was clutched to the shaft) and this rocking of the yoke draws the arm 174 to the right in Fig. 23 so as to clutch the high-speed driver to the shaft 170. It should be explained that the low-speed driver, although it rotates the die in the same direction of rotation as the work, yet its speed of rotation is somewhat less than that of the work so that the die will properly feed along the work by the engagement of its chasers therewith. The high-speed driver, however, rotates the die at a speed much greater than that of the work so that it causes the die to automatically feed back off of the work.

In order that the die may be disengaged from the work to prevent injuring the end thereof, I provide a spring 193, one end of which is attached to a pin 194 projecting out from the bearing 181 (see Fig. 25) and the other end of which is attached to the bent end of a pin 195 which extends longitudinally of the spindle and which is carried by the bracket 183.

It is unnecessary to explain the operation of the machine, as the operation of the various parts thereof has been fully explained in connection with the description of them. The stock is fed automatically the proper distance, is then acted upon by the various tools mounted upon the tool-carrier, and is then severed or cut off.

I have described the turret and the main tool-slide as having four spindles and four tool-receiving faces, but I have contemplated using a greater or less number of tools and with a corresponding number of faces on the tool-slide.

Having thus explained the nature of my said invention and described a way of constructing and using the same, although without attempting to set forth all of the forms in which it may be made, or all of the modes of its use, I declare that what I claim is:—

1. In a multi-spindle machine, the combination of a bed, a turret journaled on said bed, a plurality of work-carrying spindles journaled in said turret, a tool slide supported by said turret, and means for effecting a relative axial movement of said turret and tool slide.

2. In a multi-spindle machine, the combination with a bed, of a turret journaled in said bed and having an extension, a tool slide mounted on said extension, and means for feeding the turret and the slide, one with relation to the other.

3. In a multi-spindle machine, the combination of a bed, a turret journaled at its ends on the bed, and having a spindle-supporting portion and a slide-supporting portion, work spindles journaled in said turret, and a tool slide supported on said turret.

4. In a multi-spindle machine, the combination of a bed, a turret journaled on said bed, and having an axial extension, work spindles journaled in said turret, a tool slide mounted on said extension, means for rotating the turret, and means for feeding the slide.

5. In a multi-spindle machine, the combination of a bed, a turret journaled on said bed, a plurality of parallel work spindles carried by the turret and arranged equidistant from the axis of said turret, a tool slide alined with the axis of the turret having peripheral faces for the reception of the tools, which faces are inside a circle cutting the axes of the work spindles, a support for the tool slide, and means for effecting a relative longitudinal movement of the tool slide and the turret.

6. In a multi-spindle machine, the combination of a bed, a work-spindle carrier on said bed, having an axial extension, a plurality of work spindles on said carrier, a tool-carrier supported on said extension and having provisions for the reception of a plurality of tools, means for effecting a relative longitudinal movement of said carriers, and means for effecting a relative step-by-step rotative movement to said carriers.

7. In a multi-spindle machine, the combination of a bed, a rotary turret having a cylindrical extension, a plurality of work spindles journaled in said turret, a tool slide having provisions for the reception of a plurality of tools, and borne by said extension, means for effecting a relative axial movement of said turret and slide, means for effecting a step-by-step rotation of said turret, and means for holding said tool slide against rotation.

8. In a multi-spindle machine, the combination of a bed, a rotary turret having a cylindrical extension, a plurality of work spindles journaled in said turret, a tool slide having provisions for the reception of a plurality of tools, and borne by said extension, means for feeding the slide, means for rotating the turret, and a guide for guiding said slide and holding it against rotation.

9. In a metal-working machine, a turret having a plurality of work spindles, a stock-feeding device, a yieldingly operated slide for advancing it, a separate slide for retracting it to the same starting point and movable independently of the first slide, mechanism for permitting the first slide to move in the feeding direction, mechanism for causing the second slide to be moved in the feeding direction, mechanism for retracting the first slide, and mechanism for retracting the second slide, said mechanisms being constructed and arranged to coöperate substantially as described.

10. In a metal working machine, a work carrying spindle, a tool slide, an operating shaft, means on said shaft for operating the tool slide, a prime power shaft, an independently driven power-transmitting mechanism, and means for driving the operating shaft by the prime power shaft or by the independently driven power-transmitting mechanism to drive it at either of two different speeds in the same direction for the purpose set forth.

11. In a multi-spindle metal-working machine, a turret having a plurality of work spindles, stock-feeding mechanism for feeding the work through said spindles, comprising a tension-operated slide for moving the spindle-stock-feeder in one direction, an independently movable slide for withdrawing and placing said stock feeder at its initial starting point, and a drum having cams for controlling the operation of said slides.

12. In a multi-spindle metal-working machine, a turret having a plurality of work spindles, a stock-feeding mechanism for feeding the work through said spindles, comprising a weight-operated means for moving the spindle-stock-feeder in one direction, positive means for withdrawing and positioning the stock feeder at the same initial starting point, and a controller for both of said means.

13. In a multi-spindle machine, a turret having a plurality of work spindles, a tool carrier, and stock-feeding mechanism comprising a weight-operated slide for moving the spindle stock-feeder in one direction, a slide for withdrawing and for placing said stock feeder, a slide for opening and closing the chuck, and a drum having cams for controlling the operation of said slides.

14. In a multi-spindle machine, a turret having a plurality of spindles, a tool carrier, and a stock-feeding mechanism comprising a weight-operated means for moving the spindle-stock feeder in one direction, means for withdrawing and for positioning the said stock feeder, means for opening and closing the chuck and a controller for said means.

In testimony whereof I have affixed my signature, in presence of two witnesses.

GEORGE OTIS GRIDLEY.

Witnesses:
WALTER J. SAXIE,
RUTH P. KEYES.